United States Patent
Bräuninger et al.

(10) Patent No.: US 9,168,567 B2
(45) Date of Patent: Oct. 27, 2015

(54) POLYMER MEMBRANES, PROCESSES FOR PRODUCTION THEREOF AND USE THEREOF

(75) Inventors: Sigmar Bräuninger, Hemsbach (DE); Werner Urban, Mannheim (DE)

(73) Assignee: BASF SE, Ludwigshafen (DE)

( * ) Notice: Subject to any disclaimer, the term of this patent is extended or adjusted under 35 U.S.C. 154(b) by 872 days.

(21) Appl. No.: 13/039,834

(22) Filed: Mar. 3, 2011

(65) Prior Publication Data
US 2011/0217620 A1  Sep. 8, 2011

Related U.S. Application Data

(60) Provisional application No. 61/310,720, filed on Mar. 5, 2010.

(51) Int. Cl.
| | |
|---|---|
| *B05D 3/12* | (2006.01) |
| *B05D 5/12* | (2006.01) |
| *C08L 27/22* | (2006.01) |
| *C08L 79/04* | (2006.01) |
| *H01M 8/10* | (2006.01) |

(52) U.S. Cl.
CPC .. *B05D 3/12* (2013.01); *B05D 5/12* (2013.01); *C08L 27/22* (2013.03); *C08L 79/04* (2013.01); *H01M 8/10* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 7,615,306 B2 | 11/2009 | Haufe et al. | |
| 7,682,722 B2 | 3/2010 | Melzner et al. | |
| 2002/0117815 A1 | 8/2002 | Suddaby et al. | |
| 2006/0286422 A1* | 12/2006 | Nakato et al. | 429/30 |
| 2007/0020502 A1 | 1/2007 | Cho et al. | |
| 2008/0268321 A1* | 10/2008 | Uensal et al. | 429/34 |
| 2009/0258274 A1 | 10/2009 | Uensal et al. | |
| 2010/0003570 A1 | 1/2010 | Finsterwalder et al. | |

FOREIGN PATENT DOCUMENTS

| | | |
|---|---|---|
| DE | 10 2004 028 141 A1 | 1/2006 |
| EP | 1 403 949 A1 | 3/2004 |
| EP | 1 624 512 A2 | 2/2006 |
| WO | WO 92/22096 A2 | 12/1992 |
| WO | WO 92/22096 A3 | 12/1992 |
| WO | WO 2004/066428 A2 | 8/2004 |
| WO | WO 2004/066428 A3 | 8/2004 |
| WO | WO 2008/014964 A2 | 2/2008 |
| WO | WO 2008/014964 A3 | 2/2008 |
| WO | WO 2008/040682 A1 | 4/2008 |

OTHER PUBLICATIONS

International Search Report and Written Opinion issued Nov. 3, 2011 in Application No. PCT/IB2011/050922.
U.S. Appl. No. 13/278,830, filed Oct. 21, 2011, Uensal, et al.
(Continued)

*Primary Examiner* — Alix Eggerding
(74) *Attorney, Agent, or Firm* — Oblon, McClelland, Maier & Neustadt, L.L.P.

(57) ABSTRACT

The invention relates to improved polymer membranes, to processes for production thereof and to the use thereof.

14 Claims, 1 Drawing Sheet

(56) References Cited

OTHER PUBLICATIONS

U.S. Appl. No. 13/278,792, filed Oct. 21, 2011, Uensal, et al.

Supplementary European Search Report issued in corresponding European patent Application No. 11 75 0279.9 dated Aug. 8, 2014 (8 pp.).

* cited by examiner

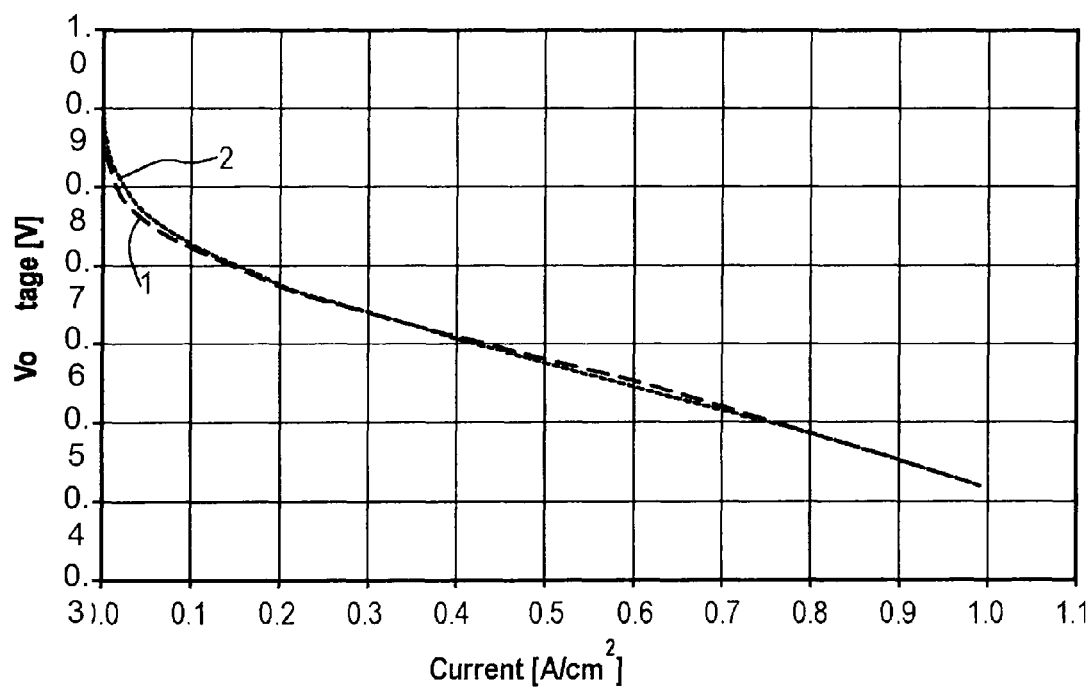

POLYMER MEMBRANES, PROCESSES FOR PRODUCTION THEREOF AND USE THEREOF

The invention relates to improved polymer membranes, to processes for production thereof and to the use thereof in an electrochemical reactor, for example a fuel cell.

Polymer membranes and the use thereof in fuel cells are already known. In membrane electrode assemblies (MEA) based on polyazole membranes, for example polybenzimidazole (PBI), the proton conductivity required is achieved by doping the polymer with phosphoric acid. Doping with phosphoric acid causes a lower mechanical stability of the polymer. At the same time, a high acid content is advantageous for ion conductivity. Especially the membranes produced in a sol-gel process consist in a high proportion of phosphoric acid and a low proportion of PBI polymer. This causes the membranes to flow under the action of pressure and temperature. In the fuel cell, flowing is prevented by using hard gaskets which ensure compression to a defined thickness. Between the gaskets is not the actual membrane but rather a so-called subgasket composed of, for example, FEP-coated polyimide (Kapton®), which gives gas-tight sealing with the membrane over the connection to the gas diffusion layers. WO 92/22096 A2 describes, for example, the use of a gasket material which does not consist of the actual membrane polymer. WO 2008/014964 A2 describes a membrane with reinforcing elements. The connection of the membrane to the subgasket may be a weak point, at which defects can occur in the course of MEA production, and leaks can occur in cell operation.

WO 2004/066428 A2 describes fuel cells with phosphoric acid-doped PBI membranes, in which the PBI membrane is used in acid-free form, and the active area is doped with phosphoric acid in the course of assembly via the acid-impregnated electrodes, the gasket region remaining undoped. DE 10 2004 028 141 A1 describes a PBI membrane with low or no doping in the gasket region and high doping with phosphoric acid in the active region.

A disadvantage of systems comprising a subgasket is that defects easily occur in the course of production thereof, and the long-term stability thereof is unsatisfactory. This is because the subgasket material becomes detached from the membrane over the operating time, or becomes brittle. Even in the course of MEA production, there may be early damage to the membrane as a result of shearing, since the membrane is squeezed in the region in which it overlaps with the subgasket. Frequently, the production steps are complicated and can be automated only with difficulty. A further disadvantage is that the subsequent doping of the PBI membrane leads to a smaller amount of acid compared to the membrane produced in the sol-gel process. This has adverse effects on conductivity and long-term stability (small acid reservoir).

It was an object of the invention to provide improved membranes which enable increased reinforcement in the gasket region on incorporation in a frame.

The present invention relates to an ion-conducting membrane based on a polymer PM with a layer S which has been applied thereto in an imagewise manner, adheres thereon and is based on a powder of a polymer PP.

Said layer S in conjunction with the membrane is suitable as a gasket edge especially in a MEA and brings about mechanical reinforcement. The membrane is especially suitable for use in an electrochemical reactor, especially for fuel cells.

Said layer S is particularly suitable as a gasket edge in a MEA together with a gasket body. Reinforcement means that the amount of polymer in the reinforced area is increased as compared with the non-reinforced area. Thus the membrane does not flow under the action of pressure and temperature in the reinforced area which is used as gasket edge.

The polymers PM and PP of the membrane and of the powder may be the same or different.

The powder PP is preferably in the form of a paste. "Imagewise" is understood to mean that the application is not over the entire area of the membrane, but rather is only in particular regions in a controlled manner.

In a preferred embodiment, the membrane has been acid-doped, especially with phosphoric acid. Particularly preferred polymer membranes are based on polybenzimidazole (PBI).

In a preferred embodiment, both polymer membrane and the powder comprise or consist of polybenzimidazole, the polymer membrane especially having been phosphoric acid-doped.

The powder used to produce the layer S preferably comprises, as essential constituents,
 a) the polymer PP, especially polybenzimidazole (PBI),
 b) a flexibilizing component B), especially a polytetrafluoroethylene powder (PTFE), and
 c) a dispersant C), especially a sulfonated polytetrafluoroethylene, for example Nafion® polymers in the form of an aqueous dispersion.

"Flexibilizing" is understood to mean more particularly that the gasket edge thus produced does not fracture when bent in a 90° radius, and no polymer particles are detached.

Preferred flexibilizing components B) are in principle all fluoropolymers, especially FEP (fluorinated polyethylenepropylenes), PVDF (polyvinylidene fluoride) and PFA (perfluoroalkoxy compounds).

The dispersants C are additives which optimize and stabilize the mixing of the constituents of the powder. Preferred dispersants are, for example,
alcohol alkoxylates, for example Degressal® SD 23,
naphthalenesulfonic acid condensates, especially sodium salts thereof, for example Tamol® NN890,
Guerbet alcohol ethoxylates, for example Lutensol® XP50,
acetylene glycol-based products, for example Dynol® 604,
acetylenediol-based, nonionic gemini surfactants, for example Surfynol® 104,
high molecular weight block copolymers with pigment-affinitive groups, for example Byk® 190-193,
organically modified polymers with pigment-affinitive groups, for example Tego® 750W/760W,
siloxane-containing gemini surfactants, for example Tego® Twin 4000,
silica-containing, silicone-free, organic polymers, for example Tego® Foamex 830 and
fluorosurfactants, optionally in a blend with alcohols, for example isopropyl alcohol and water, for example Zonyl® FSA.

The powder used for the layer S is preferably used in the form of a dispersion or free-flowing paste, preferably within a viscosity range from 1 to 10 000 mPas, especially 10 to 1000 mPas, measured at a temperature of 20° C.

The solids present in the dispersion of the powder for use in accordance with the invention are preferably:
 a) 30 to 50 parts by weight of the polymer PP
 b) 30 to 50 parts by weight of a flexibilizing component B)
 c) 5 to 15 parts by weight of a dispersant C).
 In addition, preferably
 d) 10 to 20 parts by weight of an agent for improving wettability, preferably of an alcohol, especially n-propanol are contained.

In addition, preferably 20 to 60 and especially 35 to 45 parts by weight of water are present.

Such a powder is preferably produced by
1. pulverizing the polymer PP preferably to a particle diameter less than 60 μm
2. dispersing the powder obtained in step 1 with the flexibilizing component B and the dispersant C in the liquid phase, preferably aqueous or alcoholic phase, and optionally adjusting it to the desired viscosity.

The invention further relates to a process for producing an inventive membrane, which comprises applying a powder of a polymer PP to a substrate (for example carrier film) and then compressing it with the acid-doped membrane. In a preferred embodiment, the application of the powder on the membrane is in the form of a lamination transfer process, especially a continuous process. Such lamination transfer processes are described, for example, in Electrochimica Acta, Vol. 40, No. 3, pp. 355-363, 1995 and J. Appl. Electrochemistry 22 (1992) 1. Lamination transfer processes are also known as "decal" processes. As a result of compressing the powder at least part of the powder penetrates into the membrane thus reinforcing the membrane.

The inventive polymer membranes are suitable for numerous electrochemical reactors, especially for fuel cell applications. The invention therefore also provides membrane electrode assemblies (MEA) for a fuel cell, comprising at least
I. an inventive polymer membrane with a gasket edge S,
II. a gasket body, wherein
III. the membrane in the periphery of the layer S has been embedded and compressed in the gasket body.

In a preferred embodiment, the gasket body consists essentially of an elastomer according to DE 10 2004 028 141 A1. In a further preferred embodiment, inelastic spacers are embedded into the gasket body composed of elastomers, and counteract excessive compression of the gasket body, but without impairing the elastic properties thereof. For example, it is possible to use elements or shims made of metal, plastic or carbon, which are much stiffer compared to the elastomer.

The invention further relates to electrochemical reactors, especially fuel cells, comprising at least one inventive membrane.

According to the invention, it is possible to achieve the reinforcement of the membrane by applying a polymer powder PP, especially pulverulent polybenzimidazole (particle size, preferably <60 μm), to both sides of the membrane in the gasket region, and then to compress it under the action of pressure and temperature (for example at 140° C., 3 minutes, 3000 N/cm$^2$), especially within a temperature range from 50 to 200° C., preferably 70 to 160° C., over a period of 0.5 to 10 minutes, especially 1 to 5 minutes, and under a pressure of generally 500 to 6000, preferably 1000 to 4000 and especially 2500 to 3500 N/cm$^2$. It is essential that the PBI powder applied absorbs some of the acid from the membrane, penetrates into the membrane and bonds therewith. This increases the polymer content in the membrane preferably from 5 to 10 to from 50 to 90% by weight. The membrane thus reinforced is no longer free-flowing even under high pressure and at high temperature. But it remains sufficiently flexible. A further advantage compared to the use of a subgasket of a different material is that the transition from the active, for example phosphoric acid-doped, membrane surface to the reinforced gasket region binds to the same material, i.e. the membrane does not end there, but rather continues in reinforced form into the gasket region.

A homogeneous thickness of the layer S by powder application is preferably achieved by means of screen printing processes. It was found that it is possible with a mixture of polytetrafluoroethylene (PTFE) powder, PBI powder and sulfonated tetrafluoroethylene polymer as a dispersing additive, at a weight ratio of dispersing additive to PBI of preferably 0.9:1.1 to 1.1:0.9, to produce stable and printable pastes. These can be printed directly onto the membrane acidified with phosphoric acid, surface-dried and then hot-compressed. This achieves membrane reinforcement. The advantage is that PTFE is incorporated between the PBI particles. After the hot compression, the reinforcing layer is of homogeneous thickness, flat and gas-tight.

In a preferred application process, the above-described paste, especially composed of PBI, PTFE and sulfonated tetrafluoroethylene powder, is applied in the form of a gasket to a carrier substrate composed, for example, of polyether sulfone (PES) film by means of screen printing. The paste is partly dried. Subsequently, the PBI membrane acidified with phosphoric acid is compressed between two of these coated substrates (with gasket frames covering one another). This results in lamination transfer from the carrier film to the PBI membrane. The compression is effected advantageously at 80° C. and a pressure of 3000 N/cm$^2$ for 1 minute.

The edge-reinforced PBI membrane is subsequently assembled with the gas diffusion electrodes to give the MEA. This is done in such a way that the electrodes with the reinforced membrane edge overlap by approx. 1-2 mm. This achieves the effect that the compressive stress at the edge of the electrode lies on the reinforcement.

Polymers PM and PP suitable for the purposes of the present invention, for production of the polymer electrolyte membranes, are known per se. All proton-conducting materials are suitable. Preference is given to using membranes which comprise acids, where the acids may be bonded covalently to polymers. In addition, a flat material can be doped with an acid in order to form a suitable membrane. In addition, it is also possible to use gels, especially polymer gels, as the membrane, in which case, for the present purposes, particularly suitable polymer membranes are described, for example, in DE 102 464 61.

These membranes can be obtained, inter alia, by swelling flat materials, for example a polymer film, with a liquid which comprises acid-containing compounds, or by preparing a mixture of polymers and acid-containing compounds and then forming a membrane by shaping a flat object and then solidifying to form a membrane.

The polymers suitable for this purpose include polyolefins, such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene (PTFE), polyhexafluoropropylene, copolymers of PTFE with hexafluoropropylene, with perfluoropropyl vinyl ether, with trifluoronitrosomethane, with carbalkoxyperfluoroalkoxy vinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, especially formed from norbornene;

polymers with C—O bonds in the main chain, for example polyacetal, polyoxymethylene, polyether, polypropylene oxide, polyepichlorohydrin, polytetrahydrofuran, polyphenylene oxide, polyether ketone, polyester, especially polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate; polymers with C—S bonds in the main chain, for example polysulfide ether, polyphenylene sulfide, polysulfones, polyether sulfone;
polymers with C—N bonds in the main chain, for example polyimines, polyisocyanides, polyetherimine, polyetherimides, polyaniline, polyaramids, polyamides, polyhydrazides, polyurethanes, polyimides, polyazoles, polyazole ether ketone, polyazines;
liquid-crystalline polymers, especially thermoplast, liquid-crystalline polyesters, for example Vectra™, and
inorganic polymers, for example polysilanes, polycarbosilanes, polysiloxanes, polysilicic acid, polysilicates, silicones, polyphosphazenes and polythiazyl.

Preference is given here to basic polymers, this being especially true of membranes which comprise acids or have been doped with acids. Useful basic polymer membranes of this kind include virtually all known polymer membranes in which the protons can be transported. Preference is given here to acids which can convey protons without additional water, for example by means of the so-called Grotthuss mechanism.

The basic polymer used in the context of the present invention is preferably a basic polymer with at least one nitrogen, oxygen or sulfur atom, preferably at least one nitrogen atom, in a repeat unit. Preference is further given to basic polymers which comprise at least one heteroaryl group.

In a preferred embodiment, the repeat unit in the basic polymer comprises an aromatic ring with at least one nitrogen atom. The aromatic ring is preferably a five- or six-membered ring having one to three nitrogen atoms, which may be fused to another ring, especially another aromatic ring.

In a particular aspect of the present invention, polymers of high thermal stability are used, which comprise at least one nitrogen, oxygen and/or sulfur atom in one repeat unit or in different repeat units.

A polymer of high thermal stability in the context of the present invention is one which can be operated for prolonged periods as a polymeric electrolyte in a fuel cell at temperatures above 120° C. "For prolonged periods" means that an inventive membrane can be operated at at least 80° C., preferably at least 120° C., more preferably at least 160° C., for at least 100 hours, preferably at least 500 hours, without any decrease in the performance, which can be measured by the method described in WO 01/18894 A2, by more than 50%, based on the starting performance.

In the context of the present invention, it is possible to use all aforementioned polymers individually or as a mixture (blend). Preference is given here especially to blends which comprise polyazoles and/or polysulfones. The preferred blend components are polyether sulfone, polyether ketone and polymers modified with sulfonic acid groups, as described in German patent applications DE 100 522 42 and DE 102 464 61.

In addition, particularly useful polymer blends for the purposes of the present invention have also been found to be those which comprise at least one basic polymer and at least one acidic polymer, preferably in a weight ratio of 1:99 to 99:1 (so-called acid-base polymer blends). Acidic polymers particularly suitable in this context comprise polymers which have sulfonic acid and/or phosphonic acid groups. Acid-base polymer blends which are very particularly suitable in accordance with the invention are described in detail, for example, in publication EP1073690 A1.

A particularly preferred group of basic polymers is that of polyazoles. A basic polymer based on polyazole comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

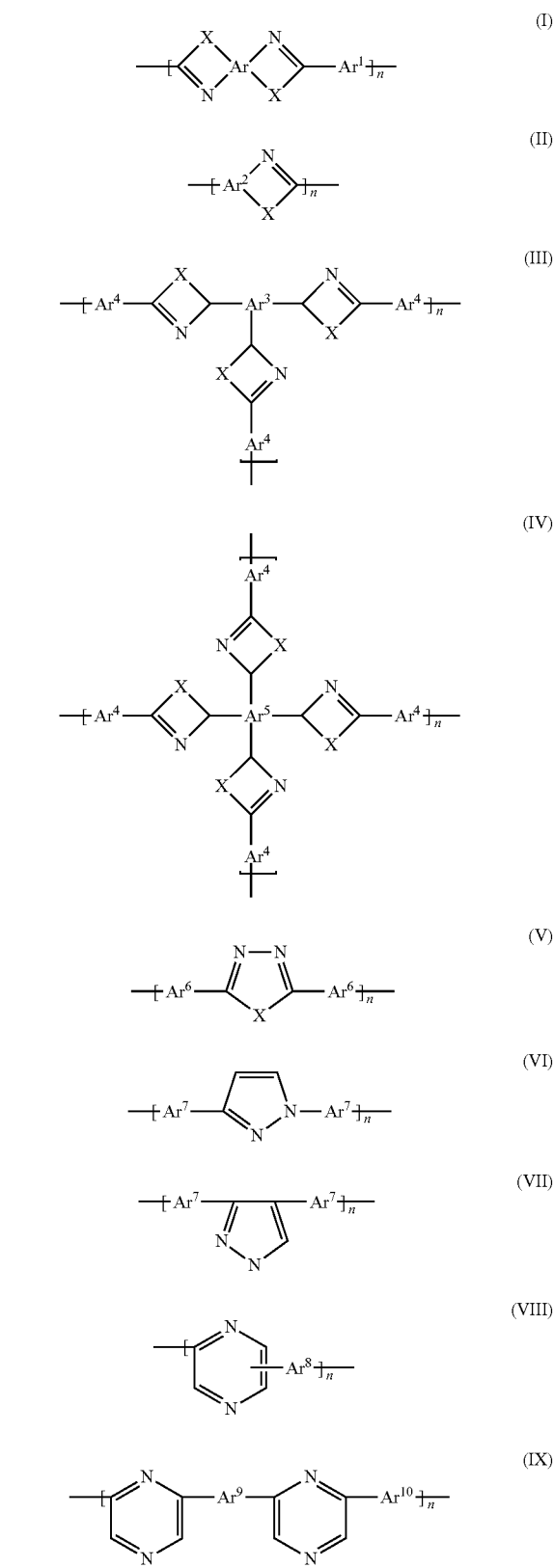

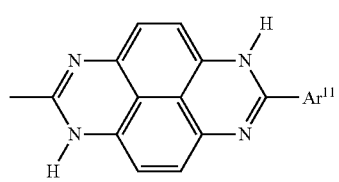
(X)

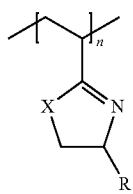
(XI)

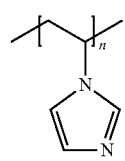
(XII)

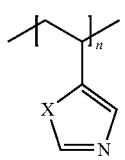
(XIII)

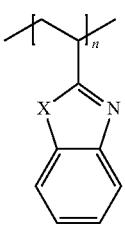
(XIV)

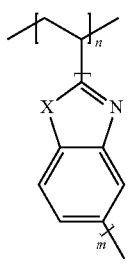
(XV)

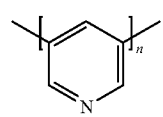
(XVI)

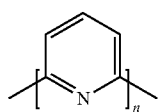
(XVII)

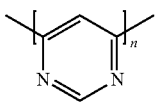
(XVIII)

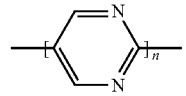
(XIX)

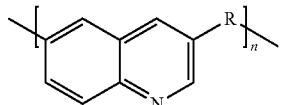
(XX)

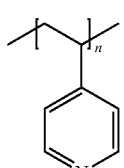
(XXI)

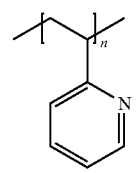
(XXII)

in which

Ar are the same or different and are each a tetravalent aromatic or heteroaromatic group which may be mono- or polycyclic, $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, $Ar^{10}$ are the same or different and are each a di- or trivalent aromatic or heteroaromatic group which may be mono- or polycyclic, $Ar^{11}$ are the same or different and are each a divalent aromatic or heteroaromatic group which may be mono- or polycyclic, X is the same or different and is oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, and is an alkyl group or an aromatic group in formula (XX), with the proviso that R in formula (XX) is not hydrogen, and n, m are each an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, benzoxazine triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines), poly(tetraazapyrenes) and polybenzoxazines.

In a further embodiment of the present invention, the polymer comprising repeat azole units is a copolymer or a blend which comprises at least two units of the formulae (I) to (XXII) which differ from one another. The polymers may be in the form of block copolymers (diblock, triblock), random copolymers, periodic copolymers and/or alternating polymers.

In a particularly preferred embodiment of the present invention, the polymer comprising repeat azole units is a polyazole which comprises only units of the formulae (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

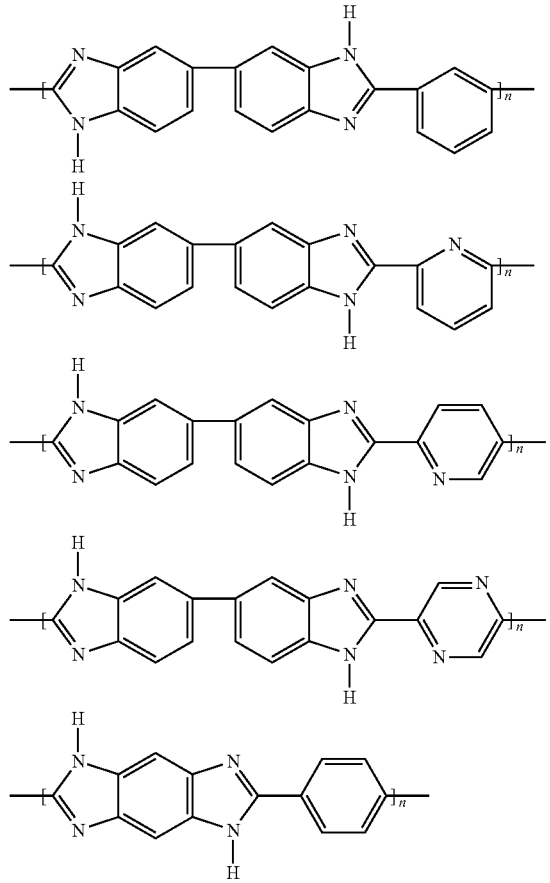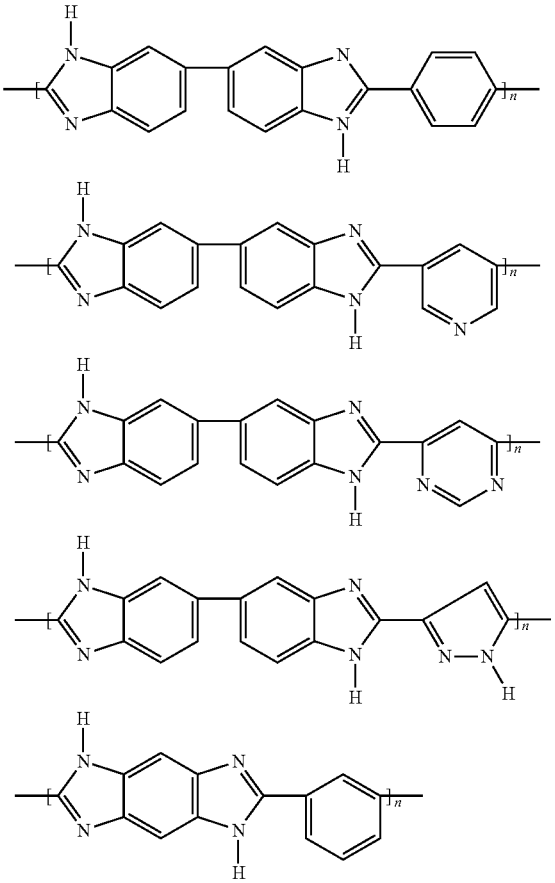

11
-continued
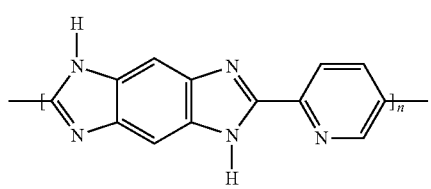
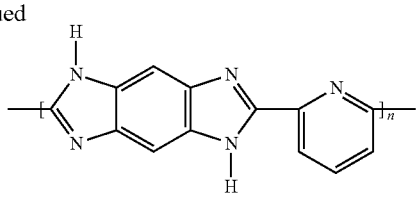
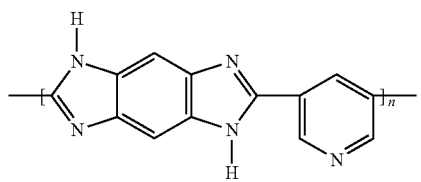
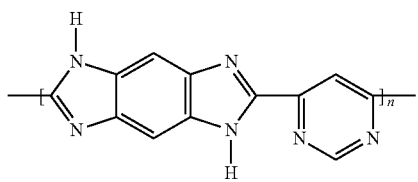
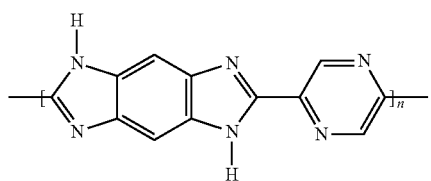
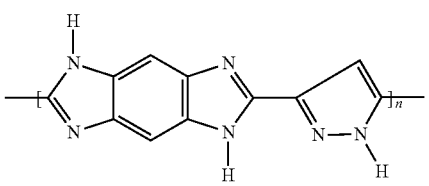
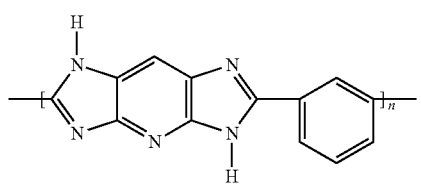
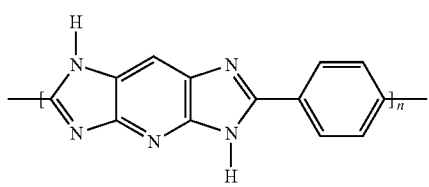
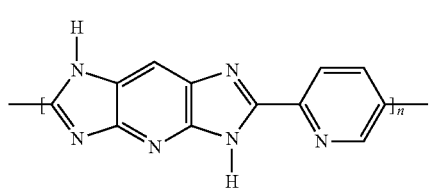
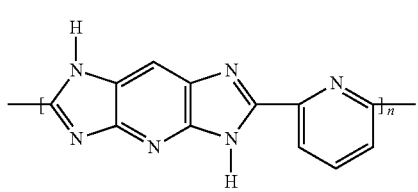
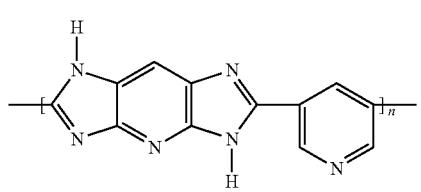
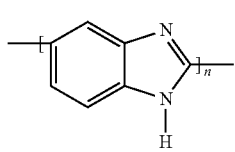
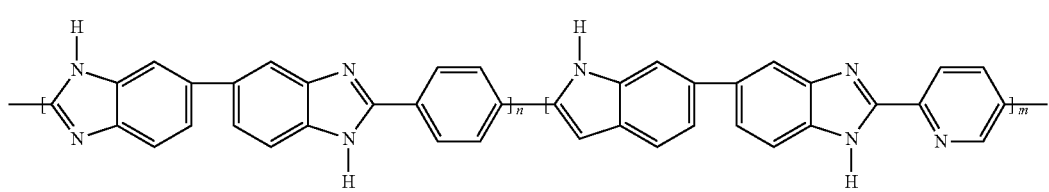
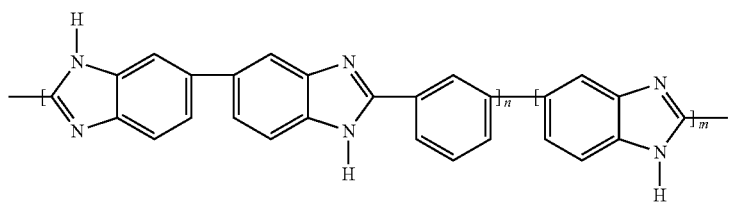

where n and m are each integers greater than or equal to 10, preferably greater than or equal to 100.

The polyazoles used, but especially the polybenzimidazoles, are notable for a high molecular weight. Measured as the intrinsic viscosity, this is at least 0.2 dl/g, preferably 0.8 to 10 dl/g, especially 1 to 10 dl/g.

Preferred polybenzimidazoles are commercially available under the Celazole® trade name.

The preferred polymers further include polysulfones, especially polysulfones having aromatic and/or heteroaromatic groups in the main chain. In a particular aspect of the present invention, preferred polysulfones and polyether sulfones have a melt volume rate MVR 300/21.6 less than or equal to 40 cm³/10 min, especially less than or equal to 30 cm³/10 min and more preferably less than or equal to 20 cm³/10 min, measured to ISO 1133. Preference is given here to polysulfones having a Vicat softening temperature VST/N50 of 180° C. to 230° C. In another preferred embodiment of the present invention, the number-average molecular weight of the polysulfones is greater than 30 000 g/mol.

The polymers based on polysulfone include especially polymers which have repeat units with joining sulfone groups corresponding to the general formulae A, B, C, D, E, F and/or G:

  (A)
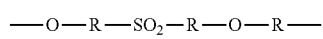  (B)

  (C)

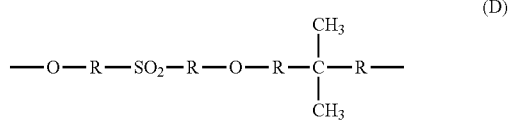  (D)

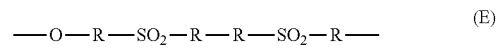  (E)

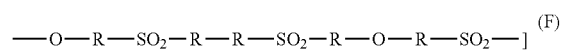  (F)

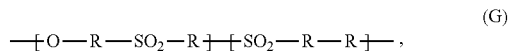  (G)

in which the R radicals are the same or different and are each independently an aromatic or heteromatic group, where these radicals have been elucidated in detail above. These include especially 1,2-phenylene, 1,3-phenylene, 1,4-phenylene, 4,4'-biphenyl, pyridine, quinoline, naphthalene, phenanthrene.

The polysulfones preferred in the context of the present invention include homo- and copolymers, for example random copolymers. Particularly preferred polysulfones comprise repeat units of the formulae H to N:

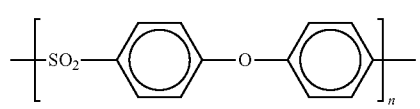  (H)

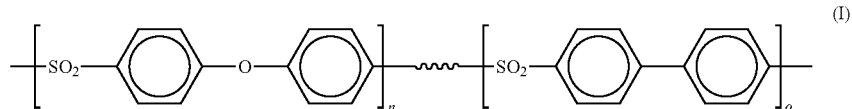  (I)

where n>o

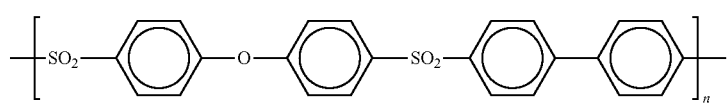  (J)

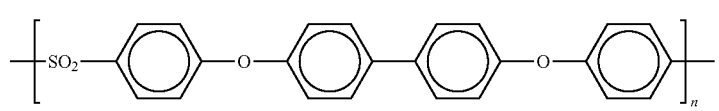  (K)

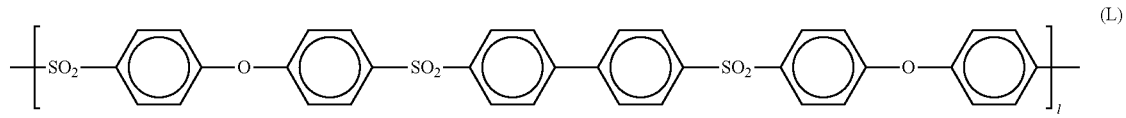  (L)

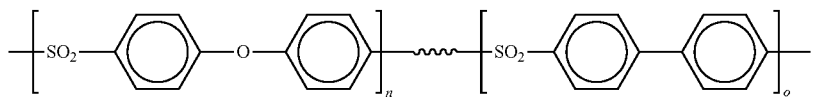

(M)

where n<o

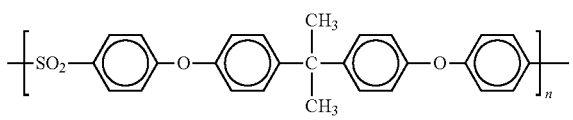

(N)

The above-described polysulfones can be obtained commercially with the following trade names: ®Victrex 200 P, ®Victrex 720 P, ®Ultrason E, ®Ultrason S, ®Mindel, ®Radel A, ®Radel R, ®Victrex HTA, ®Astrel and ®Udel.

In addition, particular preference is given to polyether ketones, polyether ketone ketones, polyether ether ketones, polyether ether ketone ketones and polyaryl ketones. These high-performance polymers are known per se and can be obtained commercially under the following trade names: Victrex® PEEK™, ®Hostatec, ®Kadel.

To produce polymer films, a polymer, preferably a polyazole, can be dissolved in a further step in polar aprotic solvents, for example dimethylacetamide (DMAc), and a film can be obtained by means of conventional processes. To remove solvent residues, the film thus obtained can be treated with a washing liquid as in German patent application DE 101 098 29. The cleaning of solvent residues from the polyazole film, described in the German patent application, surprisingly improves the mechanical properties of the film. These properties comprise especially the modulus of elasticity, the elongation at break and the fracture toughness of the film.

In addition, the polymer film may have further modifications, for example by crosslinking, as described in German patent application DE 101 107 52 or in WO 00/44816. In a preferred embodiment, the polymer film used, composed of a basic polymer and at least one blend component, additionally comprises a crosslinker, as described in German patent application DE 101 401 47.

The thickness of the polyazole films may be within wide ranges. The thickness of the polyazole film before doping with acid is preferably in the range from 5 µm to 2000 µm, more preferably in the range from 10 µm to 1000 µm, especially preferably in the range from 20 µm to 1000 µm, without any intention that this should impose a restriction.

In order to achieve proton conductivity, these films are doped with an acid. Acids in this context comprise all known Lewis and Brønsted acids, preferably inorganic Lewis and Brønsted acids.

In addition, the use of polyacids is also possible, especially isopolyacids and heteropolyacids, and also of mixtures of different acids. In the context of the present invention, heteropolyacids refer to inorganic polyacids having at least two different central atoms, which form as partial mixed anhydrides from polybasic oxygen acids, each of them weak, of a metal (preferably Cr, Mo, V, W) and of a nonmetal (preferably As, I, P, Se, Si, Te). They include 12-molybdatophosphoric acid and 12-tungstophosphoric acid.

The degree of doping can be used to influence the conductivity of the polyazole film. The conductivity increases with rising concentration of dopant until a maximum value is attained.

According to the invention, the degree of doping is reported as mol of acid per mole of repeat unit of the polymer. In the context of the present invention, a preferred degree of doping is between 3 and 80, appropriately between 5 and 60, especially between 12 and 60.

Particularly preferred dopants are sulfuric acid and phosphoric acid, or compounds which release these acids, for example on hydrolysis. A very particularly preferred dopant is phosphoric acid ($H_3PO_4$). In this context, generally highly concentrated acids are used. In a particular aspect of the present invention, the concentration of phosphoric acid is at least 50% by weight, especially at least 80% by weight, based on the weight of the dopant.

In a preferred embodiment, the inventive membranes are fiber-reinforced, as specified in WO 2008/014964 A2, page 17 line 39 to page 21 line 33.

The inventive membranes can be produced in a manner known per se as specified in WO 2008/014964 A2 on pages 21 ff.

The inventive membrane electrode assembly comprises at least one inventive membrane with the inventive gasket edge S and at least two electrochemically active electrodes (anode and cathode), which are separated by the membrane. The electrodes are known per se and are capable of catalyzing the oxidation of hydrogen and/or at least one reformate and the reduction of oxygen. This property can be obtained by coating the electrodes with platinum or platinum alloys. The term "electrode" means that the material is electrically conductive. Such electrodes are known and are described, for example, in U.S. Pat. No. 4,191,618, U.S. Pat. No. 4,212,714 and U.S. Pat. No. 4,333,805.

The catalyst layer is generally not self-supporting, but rather is typically applied to the gas diffusion layer and/or the membrane. In this case, a portion of the catalyst layer can penetrate, for example, into the gas diffusion layer and/or the membrane, which forms transition layers. The result of this may also be that the catalyst layer can be interpreted as part of the gas diffusion layer.

According to the invention, the surfaces of the polymer electrolyte membrane are in contact with the electrodes such that the first electrode covers the front side of the polymer electrolyte membrane and the second electrode the back side of the polymer electrolyte membrane, in each case partly or fully, preferably only partly. In this context, the front and back sides of the polymer electrolyte membrane refer respectively to the sides of the polymer electrolyte membrane facing toward and away from the observer, with observation proceeding from the first electrode (front), preferably the cathode, in the direction of the second electrode (back), preferably the anode.

To produce the inventive membrane electrode assembly, the different constituents of the membrane electrode assembly are placed one on top of another and bonded to one another by means of pressure and temperature, with lamination typically at a temperature in the range from 10 to 300° C., especially 20° C. to 200° C., and with a pressure in the range from 1 to 1000 bar, especially from 3 to 300 bar.

Since the performance of a single fuel cell is often too low for many applications, preference is given in the context of the present invention to combining several single fuel cells by means of separator plates to form a fuel cell (fuel cell stack). In this case, the separator plates, optionally in interplay with further gasket materials, should seal the gas spaces of the cathode and of the anode from the outside, and between the gas spaces of the cathode and of the anode. For this purpose, the separator plates are preferably placed with sealing onto the membrane electrode assembly. The sealing action can be enhanced further by compressing the composite composed of separator plates and membrane electrode assembly.

The separator plates preferably each have at least one gas channel for reaction gases, which are favorably arranged on the sides facing toward the electrodes. The gas channels should enable the distribution of the reactant fluids.

It has been found that, particularly surprisingly, the inventive membrane electrode assemblies are notable for a distinct improvement in mechanical stability and strength, and can therefore be used for production of fuel cell stacks with particularly stable performance. At the same time, the performance variations which have been customary to date in the resulting fuel cell stacks are no longer observed, and a hitherto unknown quality, reliability and reproducibility is achieved.

It has been shown that
the electrochemical performance is not influenced by edge reinforcement,
the reinforced edge is more stable in the accelerated ex situ storage test than the unreinforced membrane,
the reinforced membrane does not flow under the conditions of gasket compression,
the cell is (for technical purposes) gas-tight.

EXAMPLE

The inventive edge-reinforced MEA was produced as follows:

Working Example

1. Production of the Printing Paste

A beaker was initially charged with 10 g of a 10% aqueous solution of a sulfonated tetrafluoroethylene polymer (Nafion®). At room temperature, 2 g of n-propanol were added while stirring with a magnetic stirrer and the mixture was stirred for a further 5 minutes. Then 5 g of screened PBI powder (250 mesh) were metered in and the mixture was stirred for a further 5 minutes. This was followed by the addition of 5 g of Teflon powder (mean particle diameter 1 μm). The mixture was stirred at room temperature for a further 30 minutes. Thereafter, the paste had a viscosity of approx. 1000 mPas.

2. Screen Printing of the Paste onto Carrier Film

The paste was subsequently printed onto an UltrasonS® (BASF) film in the form of the gasket edge. The screen size used was 32×120 W PW. The paste was dried under air at room temperature. The height of the dried printed layer was approx. 65 μm.

3. Lamination Transfer to Produce the Edge-Reinforced Membrane

Two of the films coated with the printing paste were arranged with the aid of a tool to cover the upper and lower sides of a CeltecP membrane. With the aid of a hot press, the lamination transfer to the membrane was effected at 80° C. and 3000 N/cm$^2$ over the course of 1 minute. The printing paste penetrated partly into the membrane, the PBI powder absorbed acid, and the edge region of the membrane was thus reinforced. The lamination transfer took place only where the tool exerted pressure. Thus, it was possible to fix the actual reinforcement region via the tool geometry. The membrane thus produced had a thickness of 150 μm in the reinforced gasket region. The unreinforced active area had a thickness of 400 μm.

4. Production of the MEA from the Edge-Reinforced Membrane

Two gas diffusion electrodes (anode and cathode) were placed to cover the membrane with the aid of a positioning and pressing tool. The gas diffusion electrodes overlapped approx. 1-2 mm with the reinforced edge. The outer region of the reinforced membrane edge remained uncovered. The MEA thickness in the uncompressed state was 1100 μm. The compression was effected at 140° C. over 30 seconds to a defined thickness, which was defined by a spacer (shim). The pressure was selected such that the MEA was compressed completely to the height of the shim (500 μm). This plastically and elastically deformed the MEA. The elastic component caused the MEA to gain thickness again after the pressure was released. This thickness was approx. 900 μm. The thickness of the reinforced membrane edge was 125 μm.

5. Fuel Cell Test

The MEA thus produced was baked in an oven at 160° C. for half an hour and then built into a fuel cell. The current/voltage characteristic did not exhibit any difference in performance compared to a standard MEA. FIG. 1 shows the corresponding characteristic, which was recorded under the following conditions:
T: 160° C.
gases supplied: hydrogen, air The characteristic designated 1) was recorded with a standard MEA, and the characteristic designated 2) with the inventive MEA.

It was found that the inventive membranes have a high stability and good gasket properties even in a continuous production process.

We claim:
1. An ion-conducting membrane comprising a polymer membrane comprising a polymer PM with a layer S which has been applied thereto in an imagewise manner, adheres thereon and is based on a powder of a polymer PP, wherein said layer S in conjunction with said polymer membrane is suitable as a gasket edge and brings about mechanical reinforcement, wherein said powder comprises
 a) the polymer PP, comprising 30 to 50 parts by weight of polybenzimidazole, parts by weight being based on the powder,
 b) a flexibilizing component comprising a polytetrafluoroethylene powder, and
 c) a dispersant comprising a sulfonated polytetrafluoroethylene.
2. The ion-conducting membrane according to claim 1, wherein a polymer content in the gasket edge composed of the polymer membrane and the layer S is higher than outside the gasket edge.

3. The ion-conducting membrane according to claim 1, wherein the polymer PM which is used as the base for the polymer membrane is identical to the polymer PP of the powder.

4. The ion-conducting membrane according to claim 1, wherein the powder is at least partly present not only on the polymer membrane surface but also in the polymer membrane itself.

5. The ion-conducting membrane according to claim 1, wherein the polymer PM is based on polybenzimidazole (PBI).

6. A process for producing a membrane according to claim 1, which comprises applying a powder of a polymer PP to a membrane film and compressing it.

7. The process according to claim 6, wherein the membrane film has been acid-doped.

8. The process according to claim 6, wherein the powder is applied in the form of a dispersion or paste.

9. The process according to claim 8, wherein the paste or dispersion of the powder has a viscosity of 1 to 1000 mPas.

10. The ion-conducting membrane according to claim 1, wherein said polymer membrane is acid doped.

11. The ion-conducting membrane according to claim 10, wherein said powder of a polymer PP absorbs some acid from said polymer membrane.

12. The ion-conducting membrane according to claim 1, wherein said polymer membrane is phosphoric acid-doped.

13. A membrane electrode assembly (MEA) for a fuel cell, comprising at least
   I. a polymer membrane according to claim 1,
   II. a gasket body, wherein
   III. the membrane in the periphery of the layer S has been embedded and compressed in the gasket body.

14. An electrochemical reactor comprising at least one membrane electrode assembly according to claim 13.

* * * * *